United States Patent
Tsukuda et al.

(10) Patent No.: US 12,163,885 B2
(45) Date of Patent: Dec. 10, 2024

(54) ANALYSIS DEVICE, ANALYSIS METHOD, TRACE LIQUID COLLECTION DEVICE, AND TRACE LIQUID COLLECTION METHOD

(71) Applicants: Shimadzu Corporation, Kyoto (JP); RIKEN, Wako (JP); KYOCERA Corporation, Kyoto (JP)

(72) Inventors: Yasuo Tsukuda, Kyoto (JP); Takahide Hiramatsu, Kyoto (JP); Toshiro Kimura, Kyoto (JP); Masayoshi Ito, Wako (JP); Yoshihide Hayashizaki, Wako (JP); Yuji Tanaka, Wako (JP); Yoshihiro Yuu, Kyoto (JP); Taku Matsudera, Kyoto (JP); Atsushi Sasaki, Kyoto (JP)

(73) Assignees: SHIMADZU CORPORATION, Kyoto (JP); RIKEN, Wako (JP); KYOCERA Corporation, Kyoto (JP)

( * ) Notice: Subject to any disclaimer, the term of this patent is extended or adjusted under 35 U.S.C. 154(b) by 850 days.

(21) Appl. No.: 17/272,022

(22) PCT Filed: Aug. 13, 2019

(86) PCT No.: PCT/JP2019/031848
§ 371 (c)(1),
(2) Date: Feb. 26, 2021

(87) PCT Pub. No.: WO2020/045080
PCT Pub. Date: Mar. 5, 2020

(65) Prior Publication Data
US 2021/0349022 A1 Nov. 11, 2021

(30) Foreign Application Priority Data
Aug. 31, 2018 (JP) ................................ 2018-163536

(51) Int. Cl.
*G01N 21/64* (2006.01)
*G01N 21/76* (2006.01)

(52) U.S. Cl.
CPC ....... *G01N 21/645* (2013.01); *G01N 21/6428* (2013.01); *G01N 21/76* (2013.01);
(Continued)

(58) Field of Classification Search
None
See application file for complete search history.

(56) References Cited

U.S. PATENT DOCUMENTS

| 5,282,473 A | * | 2/1994 | Braig | A61B 5/083 |
| | | | | 250/343 |
| 6,396,584 B1 | * | 5/2002 | Taguchi | G01N 21/27 |
| | | | | 356/246 |

(Continued)

FOREIGN PATENT DOCUMENTS

| CN | 201247197 Y1 | 5/2009 |
| CN | 201425580 | 3/2010 |

(Continued)

OTHER PUBLICATIONS

Written Opinion for application No. PCT/JP2019/031848 dated Oct. 29, 2019, submitted with a partial translation.

(Continued)

*Primary Examiner* — Brian R Gordon
(74) *Attorney, Agent, or Firm* — Muir Patent Law, PLLC (57) ABSTRACT

An analysis device including a flow channel member, a suction mechanism, and a measurement unit. The flow channel member includes a flow channel; The suction mechanism is connected to a first end of the flow channel member and is configured to introduce a liquid sample from a second end of the flow channel member to the flow channel and hold the liquid sample between fluid layers in a part of (Continued)

the flow channel. The measurement unit includes a light irradiation unit a light reception unit configured to receive light from the part of the flow channel and the contents of the part of the flow channel when irradiated by the light irradiation unit. The measurement unit includes an aperture member to limit light from the light irradiation unit and includes an opening having an opening width shorter than the length of the part of the flow channel.

11 Claims, 4 Drawing Sheets

(52) U.S. Cl.
CPC ............... *G01N 2021/6439* (2013.01); *G01N 2021/6482* (2013.01)

(56) References Cited

U.S. PATENT DOCUMENTS

| | | | | |
|---|---|---|---|---|
| 6,399,952 | B1* | 6/2002 | Maher | G01N 21/6452 250/461.1 |
| 6,441,387 | B1* | 8/2002 | DeSha | G01N 21/47 250/573 |
| 7,758,811 | B2* | 7/2010 | Durack | G01N 33/5005 436/63 |
| 2003/0038248 | A1* | 2/2003 | Maher | G01N 21/253 250/458.1 |
| 2006/0119852 | A1* | 6/2006 | Shimizu | G01N 21/553 356/246 |
| 2007/0053797 | A1* | 3/2007 | Muraishi | G01N 35/1095 422/400 |
| 2007/0077169 | A1 | 4/2007 | Yang et al. | |
| 2007/0081159 | A1 | 4/2007 | Giffin et al. | |
| 2007/0172961 | A1 | 7/2007 | Kamei et al. | |
| 2007/0201021 | A1 | 8/2007 | Schembri et al. | |
| 2007/0263210 | A1* | 11/2007 | Taguchi | G01N 21/645 356/318 |
| 2008/0261294 | A1* | 10/2008 | Noda | C12Q 1/04 435/286.2 |
| 2009/0025489 | A1* | 1/2009 | Christensen | G01N 21/645 73/864 |
| 2009/0073435 | A1 | 3/2009 | Tsukuda | |
| 2009/0189088 | A1* | 7/2009 | Ayliffe | G01N 21/05 250/576 |
| 2010/0045980 | A1 | 2/2010 | Tsukuda | |
| 2011/0159606 | A1* | 6/2011 | Kusuura | B01L 3/021 422/507 |
| 2012/0094307 | A1* | 4/2012 | Tajima | G01N 33/54313 422/549 |
| 2013/0084606 | A1* | 4/2013 | Sugimoto | C08L 91/00 435/287.2 |
| 2013/0266480 | A1* | 10/2013 | Kimura | G01N 21/6428 422/69 |
| 2014/0011293 | A1* | 1/2014 | Horii | G01N 21/6428 422/69 |
| 2014/0134620 | A1* | 5/2014 | Tajima | G01N 21/76 435/6.12 |
| 2014/0273277 | A1 | 9/2014 | Diamond et al. | |
| 2015/0060700 | A1* | 3/2015 | Bjornson | G01N 21/64 250/461.1 |
| 2015/0308944 | A1* | 10/2015 | Bjornson | G01N 21/17 250/564 |
| 2015/0309059 | A1* | 10/2015 | Tajima | B01L 7/52 435/6.12 |
| 2016/0153936 | A1* | 6/2016 | Miyata | G01N 27/44782 204/603 |
| 2017/0191974 | A1* | 7/2017 | Tamura | G01N 21/6428 |
| 2018/0024045 | A1* | 1/2018 | Page | G01N 21/27 436/164 |
| 2018/0169648 | A1 | 6/2018 | Trau et al. | |
| 2019/0120752 | A1* | 4/2019 | Tajima | G01N 21/272 |
| 2020/0324286 | A1* | 10/2020 | Sakai | G01N 15/1404 |
| 2021/0106985 | A1* | 4/2021 | Tajima | G01N 21/76 |

FOREIGN PATENT DOCUMENTS

| | | |
|---|---|---|
| JP | 60-086439 | 5/1985 |
| JP | 02-013857 A | 1/1990 |
| JP | 2005-308731 A | 11/2005 |
| JP | 2007-121275 A | 5/2007 |
| JP | 4645739 B2 | 12/2010 |
| JP | 4853518 B2 | 11/2011 |

OTHER PUBLICATIONS

Office Action from the Japanese Patent Office for corresponding patent application No. JP 2020-539322, dated Oct. 27, 2021.
Extended European Search Report dated Apr. 7, 2022 for corresponding application No. EP 19 85 5012.
Office Action dated Oct. 23, 2023 for corresponding Chinese patent application No. 201980056195.2.
European Office Action dated Apr. 16, 2024 for corresponding application No. EP 19 855 012.1.
Second Office Action dated Jul. 24, 2024 for corresponding application No. CN 201980056195.2.

* cited by examiner

ANALYSIS DEVICE, ANALYSIS METHOD, TRACE LIQUID COLLECTION DEVICE, AND TRACE LIQUID COLLECTION METHOD

TECHNICAL FIELD

The present disclosure relates to an analysis device, an analysis method, a trace liquid collection device, and a trace liquid collection method.

BACKGROUND ART

As a conventional analysis device, an analysis device capable of measuring a trace amount of a liquid sample as small as about several μL is disclosed in Japanese Patent No. 4645739 (Patent Document 1) and Japanese Patent No. 4853518 (Patent Document 2).

In the analysis device disclosed in Patent Document 1 and Patent Document 2, when analyzing a liquid (liquid sample), a sample table is placed at a dropping position positioned below a dropping device, and a liquid sample is dropped onto the sample table. Subsequently, the dropped liquid sample is sandwiched between a holding portion and the sample table, and the sample table is moved so that the liquid sample is positioned on an optical path of measurement light. Thereafter, measurement light passed through the liquid sample is received, and the liquid sample is analyzed.

PRIOR ART DOCUMENT

Patent Document

Patent Document 1: Japanese Patent No. 4,645,739
Patent Document 2: Japanese Patent No. 4,853,518

SUMMARY OF THE INVENTION

Problems to be Solved by the Invention

However, in Patent Document 1 and Patent Document 2, since it is configured such that a liquid sample is dropped onto a sample table, in cases where a trace amount of a liquid sample to be analyzed is as extremely small as about 1 nL to 100 nL, it is difficult to control the dropping. On the other hand, in cases where the liquid sample is diluted to ensure an appropriate amount for dripping, the concentration of the liquid sample becomes too low. Thus, it was difficult to analyze a trace amount of a liquid sample below 1 μL.

The present disclosure has been made in view of the above problems, and it is an object of the present disclosure to provide an analysis device, an analysis method, a trace liquid collection device, and a trace liquid collection method capable of analyzing a trace amount of a liquid sample.

Means for Solving the Problem

An analysis device according to the present disclosure is provided with:
a flow channel;
a suction mechanism connected to one end of the flow channel, the suction mechanism being configured to introduce a trace amount of a liquid sample from the other end of the flow channel to an inside of the flow channel and hold the liquid sample in a part of the flow channel; and
a measurement unit configured such that a light irradiation unit for irradiating the liquid sample held in the part of the flow channel with light and a light reception unit for receiving light from the liquid sample are positioned around the liquid sample.

The measurement unit is provided with an aperture member for limiting the light directed from the light irradiation unit toward the liquid sample, the aperture member having an opening width shorter than a liquid length of the liquid sample in the flow channel, the liquid sample being held in the flow channel.

By having the above-described configuration, it is possible to measure the optical properties of a trace amount of the liquid sample using the measurement unit while holding the liquid sample suctioned into the flow channel by the suction mechanism. Furthermore, even in cases where the quantity of the liquid sample to be suctioned varies, by providing the measurement unit with the aperture member having an opening width shorter than the liquid length of the liquid sample held in the flow channel, it becomes possible to irradiate the part where the liquid sample is present with light. This allows the analysis of a trace amount of a liquid sample.

In the above-described analysis method based on the present disclosure, the analysis device may further include a liquid collection device configured to collect a trace amount of a fluid and a device main body configured to allow the liquid collection device to be inserted. The liquid collection device preferably includes a flow channel member in which the flow channel is formed and the suction mechanism. The device main body preferably includes the measurement unit therein. The measurement unit preferably measures the liquid sample held in the flow channel member inserted into an inside of the device main body.

By configuring as described above, it is possible to measure the liquid sample by inserting the liquid collection device into the device main body in a state in which the liquid is held in the flow channel member In the above-described analysis device based on the present disclosure, the suction mechanism preferably suctions the liquid sample so that the liquid sample is held between air layers or liquid layers formed on both end sides of the flow channel.

By configuring as described above, the liquid sample can be held at a position away from the opening surface on the other end side of the flow channel member in contact with the outer outside air. As a result, volatilization of the liquid sample from the opening surface to the outside air can be suppressed. In addition, since the liquid sample is prevented from being arranged on one end of the flow channel member, the length of the flow channel member to be inserted into the device main body can be shortened.

In the above-described analysis device based on the present disclosure, the liquid sample may be a mixture in which a sample including a nucleic acid, an amino acid, a peptide, a protein, a lipid, a metabolite, a cell, a structural body constituting a part of a cell, a chromosome, a viral particle, and a bacterium, and a fluorescent reagent for fluorescently labeling the sample, a molecular reagent such as an antibody having a fluorescently labeled specific binding ability, or a luminescent reagent for luminescently labeling are mixed.

By collecting and measuring the mixture mixed in advance as described above, it is possible to omit the operation of adjusting the sample and the reagent on the side of the analysis device.

In the above-described analysis device based on the present disclosure, it may be configured such that the suction mechanism suctions two types of liquids of a sample including a nucleic acid, an amino acid, a peptide, a protein, a lipid, a metabolite, a cell and a fluorescent reagent for fluorescently labeling the sample or a luminescent reagent for luminescent labeling in this order, and mixes the two types of suctioned liquids in the flow channel. In this case, the measurement unit preferably measures a mixture in which the two types of liquids are mixed.

When configured as described above, it becomes possible to mix the sample with the fluorescent reagent or the luminescent reagent by the suction mechanism. Therefore, it is possible to omit the operation of adjusting the mixture in which the sample and the fluorescent reagent or the luminescent reagent are mixed in advance before the collection by the liquid collection device.

In the above-described analysis method based on the present disclosure, the analysis device may include a liquid length measurement unit configured to measure a liquid length of the liquid sample held in the flow channel, the liquid length measurement means calculating a volume of the liquid sample.

When configured as described above, since the liquid sample held in the flow channel is measured, a more accurate analysis can be performed.

In the above-described analysis device based on the present disclosure, a suction amount of the liquid sample by the suction mechanism may be corrected based on a calculated volume of the liquid sample.

In the above-described analysis device based on the present disclosure, a result of the measurement may be corrected based on a calculated volume of the liquid sample.

According to the analysis device based on the above-described disclosure, it may be configured such that the suction mechanism repeatedly pressurizes and depressurizes the inside of the flow channel while holding the sample and the fluorescent reagent or the luminescent reagent in the flow channel to mix the sample and the fluorescent reagent.

When configured as described above, a mixture can be prepared by controlling the suction mechanism.

In the above-described analysis device based on the present disclosure, the device main body may be provided with a guide for guiding insertion of the flow channel member, the guide extending in an insertion direction of the flow channel member. In this case, the aperture member is preferably configured by the guide.

By configuring as described above so that the guide has a function to guide the insertion of the flow channel member, the number of components can be reduced.

In the above-described analysis device based on the present disclosure, a suction amount of the liquid sample is 1 nL to 100 nL. According to the above-described configuration, it is possible to suitably analyze an extremely small amount of a liquid sample.

In the analysis device based on the above-described disclosure, a hollow cross-section of the flow channel may be circular. According to the above-described configuration, it is possible to stably hold the liquid sample in the flow channel In the above-described analysis device based on the present disclosure, an inner diameter of the flow channel may be 2.0 mm or less.

According to the above-described configuration, it is possible to hold a liquid sample in the flow channel so as to have an appropriate liquid length.

An analysis method based on the present disclosure includes:
  introducing a trace amount of a liquid sample into an inside of a flow channel from the other end of the flow channel connected to one end of the flow channel, and holding the liquid sample in a part of the flow channel;
  irradiating the liquid sample held in a part of the flow channel with light from a light irradiation unit arranged so as to be positioned around the liquid sample with respect to the liquid sample;
  receiving light from the liquid sample with a light reception unit arranged so as to be positioned around the liquid sample with respect to the liquid sample; and
  measuring light from the light irradiation unit by limiting the light from the light irradiation unit toward the liquid sample by an aperture member having an opening width shorter than a liquid length of the liquid sample in the flow channel, the liquid sample being held in the flow channel.

According to the above-described analysis method, it is possible to measure optical properties of a trace amount of a liquid sample using the measurement unit while holding the liquid sample suctioned into the flow channel by the suction mechanism in the flow channel. Furthermore, by limiting the light from the light irradiation unit toward the liquid sample by the aperture member having the opening width shorter than the liquid length of the liquid sample held in the flow channel, even in cases where the quantity of the suctioned liquid sample varies, it is possible to emit the light to the part where the liquid sample is present. This allows an analysis of a trace amount of a liquid sample.

In the above-described analysis method based on the present disclosure, the liquid sample is preferably suctioned so that the liquid sample is held between air layers or liquid layers formed on both end sides of the flow channel.

According to the above-described analysis method, it is possible to suppress the liquid sample held in the flow channel from evaporating.

In the analysis method based on the above-described present disclosure, a suction amount of the liquid sample may be 1 nL to 100 nL. According to the above-described analysis method, an extremely small amount of the liquid sample can be suitably analyzed.

In the above-described analysis method based on the present disclosure, the liquid sample may be a mixture in which a sample including a nucleic acid, an amino acid, a peptide, a protein, a lipid, a metabolite, a cell and a fluorescent reagent for fluorescently labeling the sample or a luminescent reagent for luminescently labeling the sample are mixed. According to the above-described analysis method, it is possible to collect and measure a mixture mixed in advance.

In the above-described analysis method based on the present disclosure, it may be configured such that two types of liquids of a sample including a nucleic acid, an amino acid, a peptide, a protein, a lipid, a metabolite, a cell and a fluorescent reagent for fluorescently labeling the sample or a luminescent reagent for luminescent labeling are suctioned by the above-described suction mechanism in this order, the two types of liquids suctioned in the flow channel are mixed, and a mixture in which the two types of liquids are mixed are measured. In this case, it is preferable to measure a mixture in which the above-described two types of liquids are mixed.

According to the above-described analysis method, since it becomes possible to mix the sample and the fluorescent reagent by the suction mechanism, it is possible to omit the operation of adjusting a mixture in which the sample and the fluorescent reagent are mixed in advance before the collection by the liquid collection device.

In the above-described analysis method according to the present disclosure, it may be configured such that a liquid length of the liquid sample held in the flow channel is measured and a volume of the liquid sample is calculated.

According to the above-described analysis method, since the liquid sample held in the flow channel is measured, a more accurate analysis can be performed.

In the above-described analysis method according to the present disclosure, a suction amount of the liquid sample may be corrected based on a calculated volume of the liquid sample.

In the above-described analysis method according to the present disclosure, a result of the measurement may be corrected based on a calculated volume of the liquid sample.

In the above-described analysis method according to the present disclosure, the sample and the fluorescent reagent may be mixed by repeatedly pressurizing and depressurizing the inside of the flow channel while holding the sample and the luminescent reagent or the luminescent reagent in the flow channel.

According to the above-described analysis method, it is possible to prepare a mixture by controlling the suction mechanism.

A trace liquid collection device according to the present disclosure, includes:
  a flow channel;
  a suction mechanism connected to one end of the flow channel, the suction mechanism being configured to introduce a trace amount of a liquid sample from the other end of the flow channel to an inside of the flow channel and hold the liquid sample in a part of the flow channel;
  a liquid length measurement means configured to measure a liquid length of the liquid sample held in the flow channel; and
  a suction control mechanism configured to calculate a volume of the liquid sample and feed back the calculated volume to the suction mechanism.

According to the above-described trace liquid collection device, it becomes possible to perform an accurate calibration by including the suction control mechanism for feeding back the calculated volume to the suction mechanism.

A trace liquid collection method according to the present invention, includes:
  introducing a trace amount of a liquid sample to an inside of a flow channel from the other end of the flow channel connected to one end of the flow channel;
  holding the liquid sample in a part of the flow channel;
  measuring a liquid length of the liquid sample held in the flow channel;
  calculating a volume of the liquid sample; and
  feeding back the calculated volume to a suction mechanism.

According to the above-described trace liquid collection method, it becomes possible to perform an accurate calibration by feeding back the calculated volume to the suction mechanism.

Effects of the Invention

According to the present disclosure, it is possible to provide an analysis device, an analysis method, a trace liquid collection device, and a trace liquid collection method capable of performing an analysis of a trace amount of a liquid sample. By assuredly performing a collection and an analysis of a valuable/trace sample, it is possible to contribute to an efficient analytical work without excessively consuming a sample.

EMBODIMENTS FOR CARRYING OUT THE INVENTION

Hereinafter, embodiments of the present disclosure will be described in detail with reference to the attached drawings. In the following embodiments, the same or common parts are denoted by the same reference numerals in the drawings, and the description thereof will not be repeated.

Embodiment 1

Figure 1:
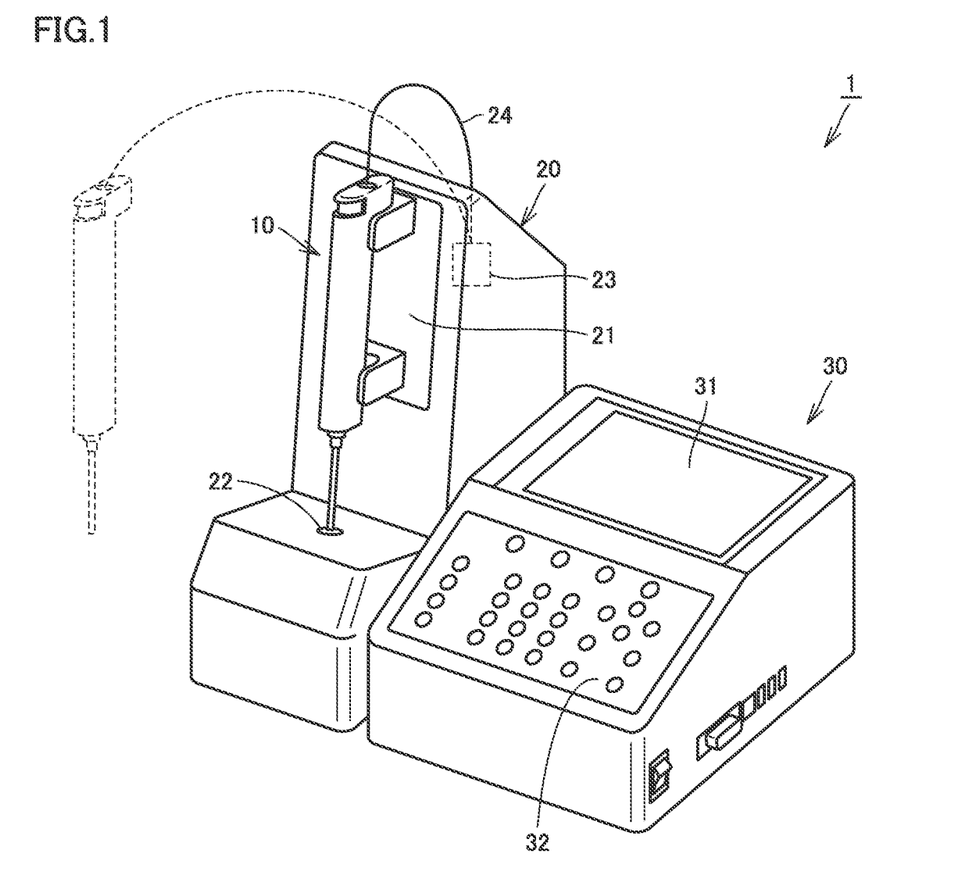
FIG. 1 is a perspective view showing an external view of an analysis device according to Embodiment 1.
Figure 2:
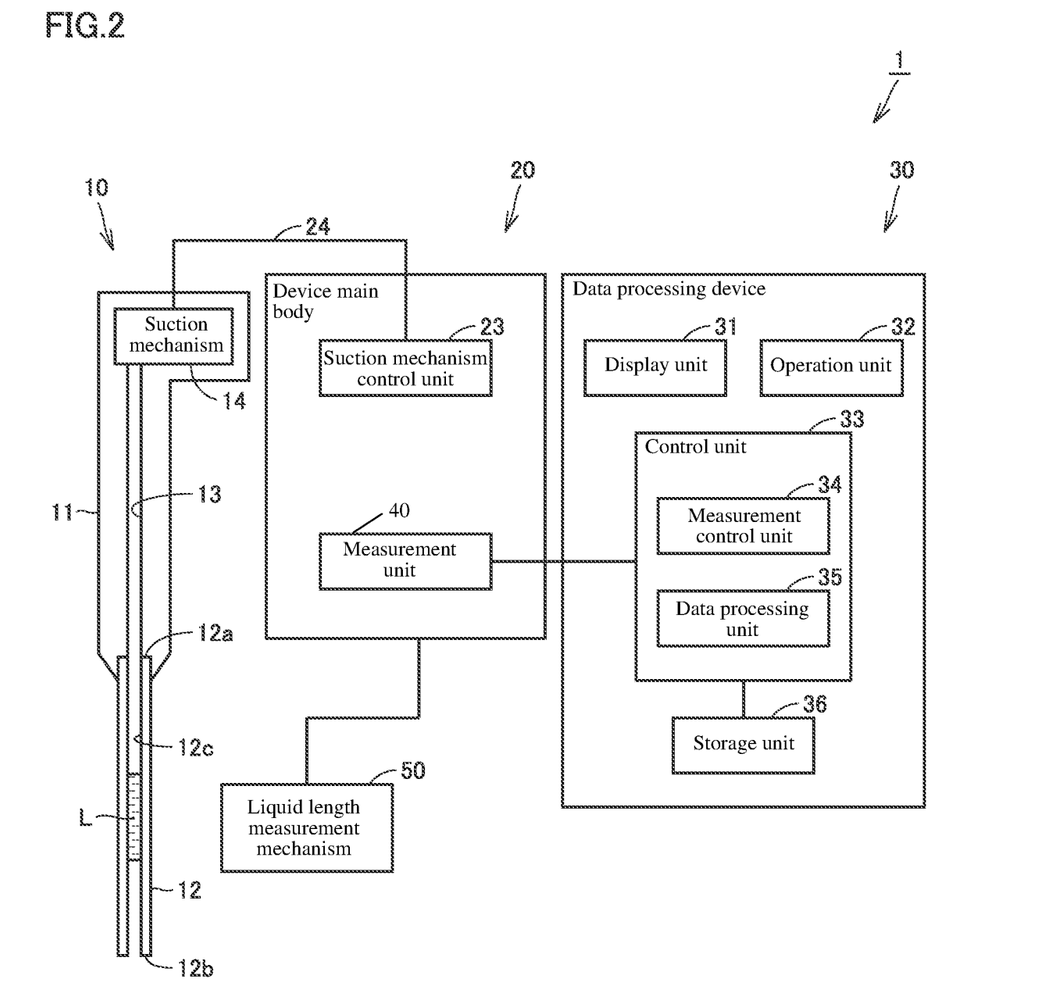
FIG. 2 is a schematic configuration diagram showing the configuration of the analysis device according to Embodiment 1.

FIG. 1 is a perspective view showing an external view of an analysis device according to Embodiment 1. FIG. 2 is a schematic configuration diagram showing the configuration of the analysis device according to Embodiment 1. Referring to FIG. 1 and FIG. 2, an analysis device 1 according to Embodiment 1 will be described.

The analysis device 1 is a device for analyzing a quantitative and/or a concentration, etc., of, for example, a nucleic acid, such as, e.g., an RNA and a DNA involved in a protein synthesis, an amino acid, a peptide, a protein, a lipid, a metabolite, a cell, a structure constituting a part of a cell, a chromosome, a viral particle, a bacterium, and the like.

As shown in FIG. 1 and FIG. 2, the analysis device 1 according to Embodiment 1 is provided with a liquid collection device 10, a device main body 20, and a data processing device 30.

The liquid collection device 10 is configured such that a small amount of a fluid L of about 1 nL to 100 nL can be collected. The liquid L to be collected by the liquid collection device 10 is, for example, a mixture in which a sample including a nucleic acid and a fluorescent reagent fluorescently labeling the nucleic acid are mixed. By collecting and measuring the pre-mixed mixture, it is possible to omit the operation of mixing the sample and the reagent on the side of the analysis device 1.

The fluorescent reagent is appropriately selected depending on a sample to be analyzed. As the fluorescent reagent, a reagent including a fluorescent dye, such as, e.g., PicoGreen (registered trademark) and SYBR Green (registered trademark), may be used.

The liquid collection device 10 includes a main body 11, a flow channel member 12, and a suction mechanism 14. The main body 11 accommodates therein the suction mechanism 14 and a part of the flow channel member 12.

The flow channel member 12 has one end 12a and the other end 12b. The flow channel member 12 is formed with a flow channel 12c through which a liquid L can flow. The flow channel 12c is formed from the one end 12a to the other end 12b of the flow channel member 12.

The flow channel member 12 is formed, for example, in a straight line. The flow channel member 12 is configured by a translucent cylindrical member. The inner diameter (flow channel diameter) of the cylindrical member is 2.0 mm or less, for example, about 0.2 mm. For the flow channel member 12, for example, a glass capillary may be used. Since the quantity to be handled is an nL-level, the inner diameter of the tubular member is preferably small so that the fluid held in the flow channel has a reasonable liquid length for measurements along the flow channel.

The one end 12a of the flow channel member 12 is attached to the main body 11. The main body 11 is provided with a through-hole 13 for connecting the flow channel 12c of the flow channel member 12 and the suction mechanism 14.

The suction mechanism 14 is provided to be connected to the flow channel 12c from one end 12a of the flow channel member 12. The suction mechanism 14 is a mechanism for suctioning a liquid sample L from the other end 12b of the flow channel member 12 into the flow channel 12c. The suction mechanism 14 suctions a liquid sample L so that the liquid sample L is held in the flow channel 12c.

The suction mechanism 14 has an actuator provided with a piezoelectric element and a diaphragm driven by the piezoelectric element. The actuator enables the suction mechanism 14 to suction a liquid sample L such that the fluid L is held within the flow channel 12c by pressurizing and depressurizing the flow channel 12c. As the piezoelectric element, for example, a piezoelectric element may be used.

The suction mechanism 14 suctions a liquid sample L so that the liquid sample L is held between air layers formed on both end sides of the flow channel 12c. As a result, the liquid sample L is arranged inner than the other end 12b of the flow channel member 12 opened to the external space. Therefore, it is possible to prevent the liquid surface of the liquid sample L from coming into contact with the spatially open outside air. Consequently, the evaporation of the liquid sample L can be reduced. Other than the air layer, any liquid which does not mix with a liquid sample L may be used. The volume change due to the pressurizing/depressurizing of the suction mechanism 14 can be suppressed, and a liquid sample L can be collected in an appropriate quantity.

Further, a liquid sample L is prevented from being held in one end 12a of the flow channel member 12. Therefore, as will be described later, when measuring, it is possible to shorten the length of the flow channel member 12 to be inserted when inserting the flow channel member 12 inside the device body 20 from the insertion hole 22.

In the above-described example, a case has been described in which the suction mechanism 14 collects a mixture in which a sample and a fluorescent reagent are mixed in advance, but the present invention is not limited thereto. The suction mechanism 14 may suction two types of liquids of a sample and a fluorescent reagent in this order, and the two types of collected liquids may be mixed in the flow channel. In this case, it is preferable to mix the above-described sample and fluorescent reagent by repeatedly pressurizing and depressurizing the inside of the flow channel 12c while holding the above-described sample and fluorescent reagent in the flow channel 12c by the suction mechanism 14

In such cases, it is possible to omit an operation of preparing a mixture in which a sample and a fluorescent reagent are mixed in advance before the suction by the suction mechanism 14. Further, a mixture can be prepared by controlling the operation of the suction mechanism 14.

The operation of the suction mechanism 14 is controlled, for example, by a suction mechanism control unit 23 provided inside the device main body 20. The suction mechanism 14 is connected to a suction mechanism control unit 23 by a wiring 24. The suction mechanism control unit 23 may be provided in the main body 11 of the liquid collection device 10. In this case, the case wiring 24 and the power supply may also be provided in the main body 11.

The device main body 20 includes a measurement unit 40 therein. The measurement unit 40 is a unit for measuring a liquid sample L suctioned by the suction mechanism 14. Note that the detailed configuration of the measurement unit 40 will be described later with reference to FIG. 3 and FIG. 4.

The device main body 20 is provided with an installation portion 21 for detachably installing the liquid collection device 10. The liquid collection device 10 is removed from the device main body 20 when collecting a liquid sample L, as indicated by the dashed line in FIG. 1. The liquid collection device 10 is installed on the device main body 20 when measuring the collected liquid sample L.

The device main body 20 is configured to allow the liquid collection device 10 to be inserted. Specifically, the device main body 20 is provided with an insertion hole 22 for inserting the flow channel member 12 of the liquid collection device 10 into the inside of the device main body 20. When amounting the liquid collection device 10 on the installation portion 21, the other end 12b side of the flow channel member 12 is inserted into the insertion hole 22 to thereby fix the main body 11 to the installation portion 21. With this, in the installation state in which the liquid collection device 10 is installed on the installation portion 21, the other end 12b side of the flow channel member 12 becomes a state of being inserted into the inside of the device main body 20, and the liquid L held in the flow channel member 12 is arranged at the measuring position in the measurement unit 40.

In the data processing device 30, a predetermined control program for executing various controls and processing is installed, and the data processing device 30 is connected to the device main body 20.

The data processing device 30 is provided with a display unit 31, an operation unit 32, a control unit 33, and a storage unit 36. The display unit 31 displays the information for operations, measured results, and the like. The operation unit 32 is for setting various parameters related to measurements and instructing various processing.

The control unit 33 includes a measurement control unit 34 and a data processing unit 35. The measurement control unit 34 controls the operation of the measurement unit 40. The data processing unit 35 executes various arithmetic processing for analyzing a liquid sample L based on the signal received from the measurement unit 40. The storage unit 36 stores the signal received from the measurement unit 40 and the execution results of the data processing unit 35. The execution results or the like stored in the storage unit 36 may be configured to be retrieved from the data processing device 30 for processing by an external computer or managing data.

Figure 3:
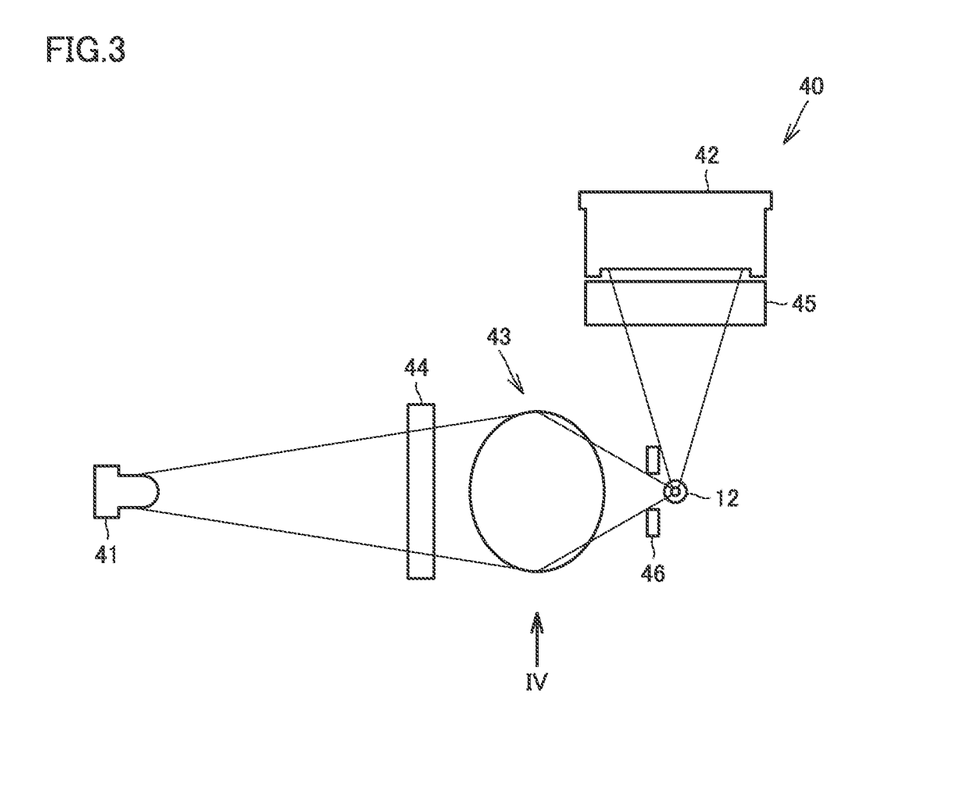
FIG. 3 is a schematic plan view showing a measurement unit according to Embodiment 1.
Figure 4:
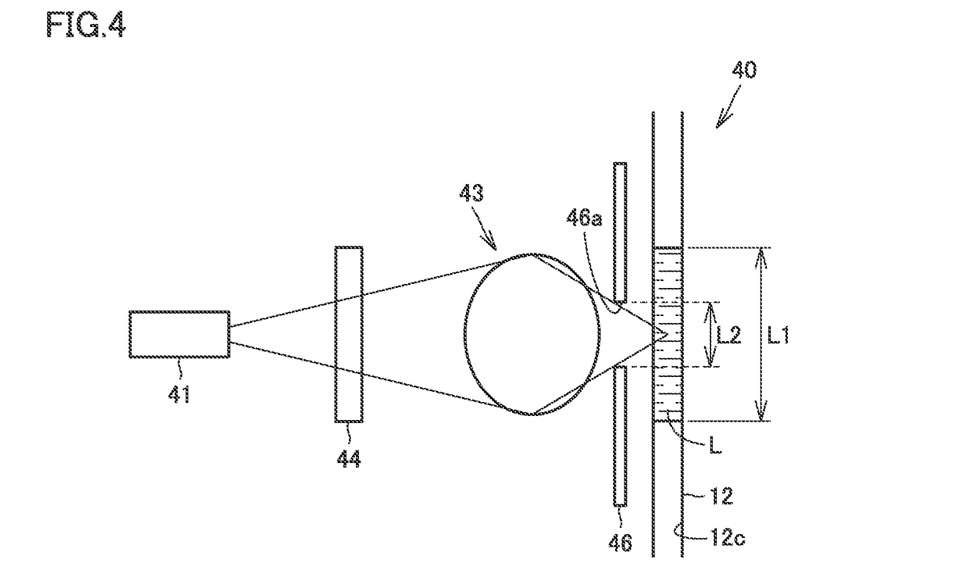
FIG. 4 is a schematic side view of the measurement unit as viewed from the arrow IV shown in FIG. 3.

FIG. 3 is a schematic plan view of the measurement unit according to Embodiment 1. FIG. 4 is a schematic side view of the measurement unit as viewed from the arrow IV shown in FIG. 3. Referring to FIG. 3 and FIG. 4, the measurement unit 40 according to Embodiment 1 will be described.

As shown in FIG. 3 and FIG. 4, the measurement unit 40 has an irradiation unit 41, a light reception unit 42, an optical system 43, a first wavelength selection element 44, a second wavelength selection element 45, and an aperture member 46. In the measurement unit 40, optical characteristics of a liquid sample L are detected by the light reception unit 42 as follows. Note that the optical characteristic is, for example, a fluorescence intensity.

The irradiation unit 41 irradiates the liquid sample L held in the flow channel member 12 with measurement light. The irradiation unit 41 emits light including a wavelength band for exciting a fluorescent dye contained in a liquid sample L (mixture) to be analyzed. The irradiation unit 41 emits, for example, blue visible light having a main wavelength of about 470 nm. For example, an LED can be used as the irradiation unit 41. The measurement light emitted from the irradiation unit 41 is directed toward the first wavelength selection element 44.

The first wavelength selection element 44 is arranged on the optical path of the measurement light from the irradiation unit 41 toward the flow channel member 12. The first wavelength selection element 44 selectively passes the light of a first wavelength band. The first wavelength selection element 44 is, for example, a band-pass filter. The first wavelength band is a wavelength band for exciting a fluorescent dye contained in a liquid sample L (mixture) to be analyzed. The measurement light passed through the first wavelength selection element 44 is guided by the optical system 43.

The optical system 43 forms at least a passage path of the measurement light, and guides the measurement light irradiated from the irradiation unit 41 to the liquid sample L held in the flow channel member 12. The optical system 43 includes, for example, a condenser lens, such as, e.g., a ball lens, while condensing the measurement light passed through the first wavelength selection element 44, and guides the measurement light to the liquid sample L.

The measurement light collected by the optical system 43 is limited in the light range by the aperture member 46 before reaching the liquid sample L held in the flow channel member 12. The aperture member 46 has, for example, a plate-like shape and is arranged in the vicinity of the flow channel member 12 inserted into the inside of the device main body 20.

The aperture member 46 has an opening 46a that defines the irradiation area of the measurement light to be emitted to the liquid sample L. The measurement light passed through the opening 46a is emitted to the liquid sample L.

The liquid sample L held in the flow channel member 12 (flow channel 12c) extends along the flow channel 12c, and the opening width L2 of the opening 46a along the flow channel 12c is shorter than the length (liquid length) L1 of the liquid sample L held in the flow channel member 12 along the flow channel 12c. Note that the length of the liquid sample L along the flow channel 12c when the trace amount of the liquid sample L is held in the flow channel 12c is approximately 2 mm to 3 mm.

When the opening width is defined in this manner, the measurement light can be emitted only to the portion where the liquid sample L exists, even if the quantity of the liquid sample L to be collected from the target varies.

As described above, the measurement light emitted to the liquid sample L has a first wavelength band for exciting a fluorescent dye contained in the liquid sample L. Therefore, fluorescence is emitted from the fluorescent dye excited by the measurement light. The portion of the measurement light that has been redirected by the liquid sample L and the flow channel member 12, as well as the emitted fluorescent light, is directed toward the light reception unit 42.

The light reception unit 42 is arranged at a position where the irradiation unit 41 is rotated by approximately 90 degrees around the central axis of the flow channel member 12. The light reception unit 42 receives the light from the liquid sample L (mixture) irradiated with the measurement light. Specifically, the light reception unit 42 receives the light emitted from the fluorescent dye and passed through the second wavelength selection element 45.

The second wavelength selection element 45 is arranged on the optical path of the light from the liquid sample L irradiated with the measurement light to the light reception unit 42. The second wavelength selection element 45 selectively passes the light of a second wavelength band that differs from the first wavelength band. The second wavelength band is a wavelength region in which the fluorescence emitted from the above-described fluorescent dye has a wavelength range. By passing the light from the liquid sample L toward the light reception unit 42 through the second wavelength selection element 45, only the fluorescent light can be introduced into the light reception unit 42.

With this, the light reception unit 42 transmits signals detected based on the received fluorescent light to the data processing unit 35. The data processing unit 35 performs arithmetic processing based on the received signal and specifies the quantity and the like of the nucleic acid contained in the sample. In this way, the liquid sample L is analyzed.

As described above, in the analysis device 1 according to this embodiment, by using the liquid collection device 10 including the flow channel member 12 in which the flow channel 12c is formed and the suction mechanism 14 as described above, by driving the suction mechanism 14, it is possible to hold the collected liquid L in the flow channel member 12 while suctioning a trace amount of the liquid L into the flow channel member 12. Further, in a state in which the liquid L is held in the flow channel member 12, by inserting the other end 12b side of the flow channel member 12 into the insertion hole 22 and installing the liquid collection device 10 on the installation portion of the device main body 20, it is possible to arrange the liquid L in the measuring position. As a result, by analyzing a trace amount of the liquid L by the measurement unit, a trace amount of the liquid L can be measured.

Embodiment 2

Figure 5:
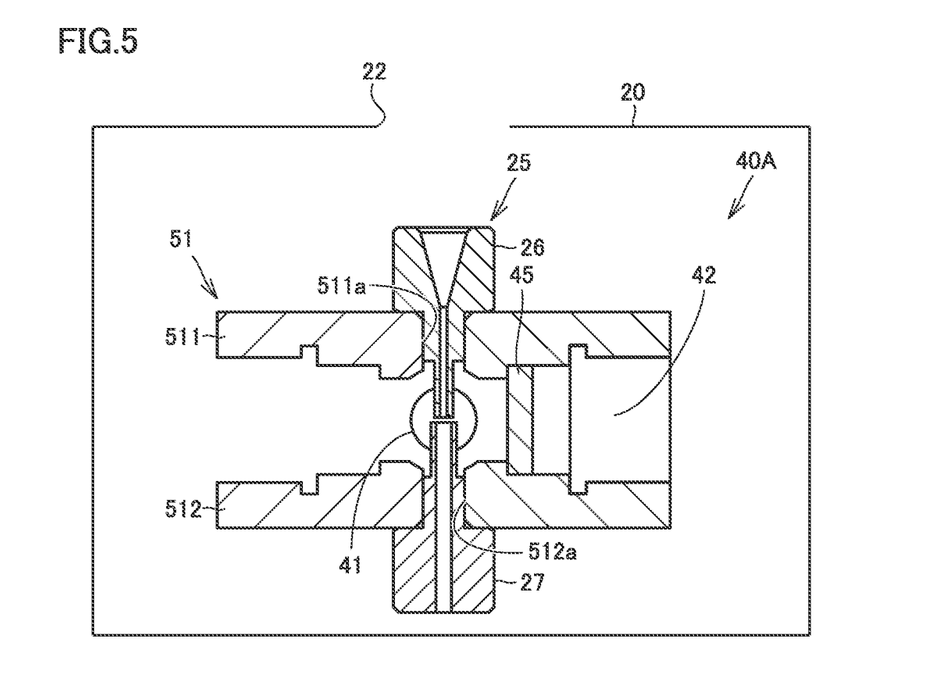
FIG. 5 is a schematic cross-sectional view showing a peripheral configuration of a measurement unit in an analysis device according to Embodiment 2.

FIG. 5 is a schematic cross-sectional view showing a peripheral configuration of a measurement unit of a device main body according to Embodiment 2. Note that FIG. 5 shows a measurement unit 40A when viewed the irradiation unit 41 from the front side, and omits the first wavelength selection element and the optical system included in the measurement unit 40A for convenience.

As shown in FIG. 5, the analysis device according to Embodiment 2 differs from the analysis device according to Embodiment 1 in that the guide 25 and the measurement unit holding unit 51 are provided, and the configuration of the measurement unit 40A is substantially the same.

The guide 25 is provided in the device main body 20. Specifically, the guide 25 is provided below the insertion hole 22 provided in the device main body 20. Note that the position of the guide 25 is not limited to the position below the insertion hole 22. The upper portion of the guide 25 may protrude from the insertion hole 22 to the outside.

The guide 25 extends in the inserting direction of the flow channel member 12 to guide the insertion of the flow channel member 12. Note that the insertion direction of the flow channel member 12 is a direction perpendicular to the opening surface of the insertion hole 22. The guide 25 is held by the measurement unit holding unit 51. The guide 25 has a first cylindrical portion 26 and a second cylindrical portion 27.

The measurement unit holding unit 51 holds the measurement unit 40A. The measurement unit holding unit 51 includes a first plate portion 511 and a second plate portion 512 spaced apart from each other in the inserting direction of the flow channel member 12. The first plate portion 511 and the second plate portion 512 are fixed together so as not to affect the measurements by the measurement unit 40A.

The first plate portion 511 and the second plate portion 512 are provided with a through-hole 511a and a through-hole 512a, respectively. The through-hole 511a and the through-hole 512a hold the guide 25. Specifically, the first cylindrical portion 26 is inserted into and held by the through-hole 511a, and the second cylindrical portion 27 is inserted into and held by the through-hole 512a.

Figure 6:
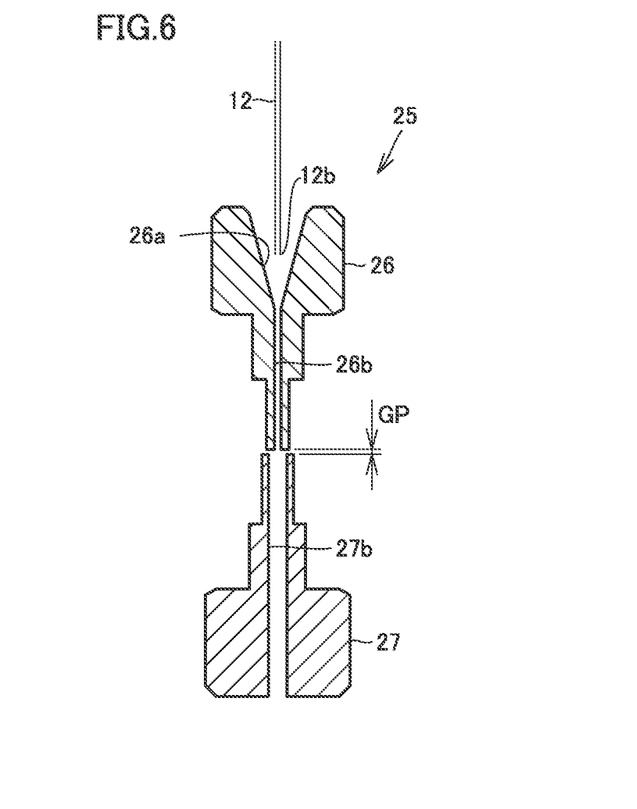
FIG. 6 is a schematic cross-sectional view showing a guide provided in the analysis device according to Embodiment 2.

FIG. 6 is a schematic cross-sectional view showing a guide provided in the device main body according to Embodiment 2. Referring to FIG. 6, the first cylindrical portion 26 and the second cylindrical portion 27 provided in the guide 25 will be described in detail.

The first cylindrical portion 26 and the second cylindrical portion 27 are arranged side by side in the insertion direction so that the cylindrical shaft is parallel to the insertion direction of the flow channel member 12. The first cylindrical portion 26 is arranged so that the flow channel member 12 is inserted before the insertion of the second cylindrical portion 27.

The first cylindrical portion 26 has an introduction portion 26a for guiding the other end 12b of the flow channel member 12 to the guide channel 26b. The introduction portion 26a is formed so that the inner diameter decreases toward the guide channel 26b. The guide channel 26b is formed in a straight line along the inserting direction.

The second cylindrical portion 27 has a guide channel 27b arranged opposite to the guide channel 26b. The diameter of the guide channel 27b is larger than the diameter of the guide channel 26b.

The other end 12b of the flow channel member 12 introduced in the introduction portion 26a enters into the inside of the guide channel 27b through the guide channel 26b by being further inserted.

Between the first cylindrical portion 26 and the second cylindrical portion 27 in the inserting direction, a gap GP is formed. The size of the gap GP in the inserting direction is shorter than the length of the liquid sample L held in the flow channel member 12 along the flow channel 12c in the inserting direction. The gap GP corresponds to the opening 46a in Embodiment 1, and the irradiated area where the liquid sample L is irradiated is defined by the gap GP. The light from the liquid sample L is directed from the gap GP to the light reception unit 42. In this manner, the guide 25 constitutes an aperture member for limiting the irradiation area of the measurement light irradiating the liquid sample L.

Even when configured as described above, the analysis device according to Embodiment 2 has substantially the same effects as those of Embodiment 1. Further, the provision of the guide 25 makes it easier to position the liquid sample L at the measuring position on the optical path of the measurement light. Furthermore, by configuring a diaphragm by the guide 25, it is possible to reduce the number of components.

In Embodiment 2 described above, an example is exemplified in which the guide 25 is configured by two cylindrical portions separated from each other, but the present invention is not limited thereto, and the guide 25 may be configured by one cylindrical portion. In this case, it is preferable to provide an opening that defines the irradiation area of the measurement light and a window that allows the light from liquid sample L to pass through the window at the peripheral wall portion of the cylindrical portion.

In Embodiments 1 and 2 described above, a case has been described in which the liquid sample is analyzed by receiving the fluorescence from a fluorescent dye using a fluorescent reagent, but the present invention is not limited thereto. It may be configured such that measurement light that has passed through the liquid sample is received by the light reception unit. Also in this case, the light reception unit can receive the light from the liquid sample L (measurement light transmitted through the liquid sample L). In this case, the sample may be analyzed by measuring the transmittance of the measurement light and thus the absorbance of the nucleic acid.

Referring back to FIG. 2, the analysis device 1 is provided with a liquid length measurement mechanism 50 for correcting an error in the quantity of the liquid sample to be measured. The liquid length measurement mechanism 50 is preferably a camera or a sensor for measuring the liquid length of a trace of the fluid held in the flow channel, and the liquid length is measured from the image obtained by the camera or the sensor.

In a conventional gravimetric method used for calibration of a liquid collection device, a liquid on the order of nL dries, making the calibration difficult. Since the suction mechanism constituting the trace liquid collection device of the present invention measures the liquid sample held in the flow channel, the influence of the drying becomes small, which enables an accurate calibration. This exerts an effect of obtaining a high-precision suction amount. As an inspection operation before sampling a liquid, the trace liquid collection device corrects the condition that the liquid amount becomes the desired amount by the suction control mechanism in a case where the liquid amount calculated by the calculation mechanism from the liquid length of the liquid sample held in the flow channel becomes different from the predetermined liquid amount when the suction mechanism is operated under the predetermined condition. From the subsequent measurements, liquid sampling is performed under the condition corrected and calculated.

Since the inner diameter of the flow channel is known, the volume of the held liquid sample can be calculated by measuring the liquid length of the liquid sample. The error can be corrected based on the calculated volume of the liquid sample. As a correction for an error, a correction of the suction operation amount of the suction mechanism and a correction of the final concentration by the mixing ratio of the sample to the fluorescent reagent can be performed.

The suction control mechanism constituting the trace liquid collection device can instruct the suction mechanism to perform the additional suction when the suctioned liquid amount is smaller than a preset liquid amount. As a result, it is possible to obtain a desired liquid amount, thereby eliminating the labor of retesting due to a failure and enabling the test with a minimum amount of the liquid sample.

On the other hand, when the suctioned liquid amount is larger than a predetermined liquid amount, a warning can be displayed so as not to perform further suction. This has the effect of preventing the trace liquid collection device from failing.

The trace liquid collection device may be a two-fluid mixing type liquid collection device that suctions two types of liquid samples into a flow channel. In this case, the suction control mechanism may be able to instruct the suction mechanism the second suction amount with respect to the first suction amount so that the mixing ratio of the two types of liquid samples becomes the desired ratio. As a result, it becomes possible to obtain a desired mixing ratio. Therefore, retesting due to a failure can be eliminated, which makes it possible to perform a test with a minimum amount of a liquid sample.

In this measurement, the environmental conditions (temperature, humidity, and atmospheric pressure) to be measured are monitored, and the setting conditions of a suction mechanism are set according to the monitored environmental conditions. In a case where a liquid sample is extremely small in amount, a failure of a suction mechanism or a connection failure of the flow channel member is notified.

The accuracy of mixing the liquid sample and the fluorescent reagent to be suctioned into the flow channel affects the concentration (final concentration) of the nucleic acid contained in the mixture to be measured. When an error occurs in the amount to be actually suctioned due to the physical properties (particularly the viscosity) of the liquid suctioned into the flow channel when performing a suction operation of suctioning a predetermined amount, an error occurs in the final concentration of the nucleic acid in the mixture, and the intensity of the light measured from the mixture differs. When the nucleic acid contained in a liquid sample to be measured is quantified with high accuracy, the error needs to be corrected.

A correction for the final concentration will be described using an example in which a liquid sample and a fluorescent reagent are mixed equal amounts. In a state in which the mixed liquid sample is suctioned, the liquid length of the sample fluid is measured. The liquid length of the mixture with the fluorescent reagent to be subsequently suctioned is measured. Since the same volume is suctioned and mixed in equal amounts, the liquid length of the fluorescent reagent is the same as that of the liquid sample.

By using a calibration curve prepared by a standard solution having a known concentration, a final concentration is calculated from the measured light intensity and applying a mixing ratio based on the measured liquid length to the final concentration, the concentration of a nucleic acid can be calculated.

For example, when a liquid sample having a nucleic acid concentration of 20 ng/μL and a fluorescent reagent are mixed in equal amounts (5:5), the final concentration becomes 10 ng/μL. However, when the ratio actually suctioned and mixed is 4:6 in a ratio of the liquid length calculated by a liquid length measurement mechanism, the concentration becomes thin and the measured light intensity becomes weak. Therefore, the concentration obtained from the calibration curve becomes 16 ng/μL. On the other hand, when converting by applying the mixing ratio (4:6) based on the measured liquid length, an accurate concentration can be calculated.

The embodiments disclosed herein are illustrative in all respects and not restrictive. The scope of the present invention is indicated by claims, and includes all modifications within the meanings and ranges equivalent to those of claims.

DESCRIPTION OF SYMBOLS

1: Analysis device
10: Liquid collection device
11: Main body
12: Flow channel member
12a: One end
12b; The other end
12c: Flow channel
13: Through-hole
14: Suction mechanism
20, 20A: Device main body
21: Installation portion
22: Insertion hole
23: Suction mechanism control unit
24: Wiring
25: Guide
26: First cylindrical portion
26a: Introduction portion
26b: Guide channel
27: Second cylindrical portion
27b: Guide channel
30: Data processing device
31: Display unit
32: Operation unit
33: Control unit
34: Measurement control unit
35: Data processing unit
36: Storage unit
40: Measurement unit
41: Irradiation unit
42: Light reception unit
43: Optical system
44: First wavelength selection element
45: Second wavelength selection element
46: Aperture member
46a: Opening
50: Liquid length measurement mechanism

The invention claimed is:
1. An analysis device comprising:
a liquid collection device comprising:
a liquid collection body,
a flow channel member coupled to the liquid collection body,
a flow channel passing through the flow channel member, and
a suction mechanism within the liquid collection body and connected to a first end of the flow channel member, the suction mechanism being configured to introduce a liquid sample from a second end of the flow channel member to the flow channel and hold the liquid sample between fluid layers in a sample portion of the flow channel;
a device main body detachably attached to the liquid collection body and the device main body includes a first opening in which the flow channel member is received; and
a measurement unit provided within the device main body, the measurement unit including:
a light irradiation unit secured in the device main body,
a light reception unit secured in the device main body, and
an aperture member secured in the device main body, wherein the light irradiation unit is positioned to irradiate the sample portion of the flow channel member including contents of the sample portion of the flow channel in the first opening, the light reception unit is positioned to receive light from the sample portion of the flow channel and the contents of the sample portion of the flow channel when irradiated by the light irradiation unit, and the aperture member is positioned between the light irradiation unit and the sample portion of the flow channel member and the aperture member includes a second opening through which light from the light irradiation unit passes to the sample portion of the flow channel member, and the second opening has a width shorter than a length of the sample portion of the flow channel.

2. The analysis device as recited in claim 1,
further comprising a liquid sample held in the sample portion of the flow channel between layers of fluid, wherein the liquid sample is a mixture including at least one of a nucleic acid, an amino acid, a peptide, a protein, a lipid, a metabolite, a cell, a structural body constituting a part of a cell, a chromosome, a viral particle, or a bacterium; and at least one of a fluorescent reagent for fluorescently labeling the sample liquid, a molecular reagent including an antibody having a fluorescently labeled specific binding ability, or a luminescent reagent for luminescently labeling the sample liquid.

3. The analysis device as recited in claim 1,
wherein the suction mechanism is configured to suction two different liquids to obtain the liquid sample including a first liquid comprising a nucleic acid, an amino acid, a peptide, a protein, a lipid, a metabolite, or a cell and a second liquid comprising a fluorescent reagent for fluorescently labeling the sample or a luminescent reagent for luminescent labeling, and the suction member is configured to mix the first liquid and the second liquid in the flow channel, and wherein the measurement unit is configured to measure a mixture in which the first liquid and the second liquid are mixed.

4. The analysis device as recited in claim 3,
wherein the suction mechanism is configured to repeatedly pressurize and depressurize the flow channel while holding the first liquid and the second liquid.

5. The analysis device as recited in claim 1, further comprising:
a liquid length measurement mechanism connected to the device main body and configured to measure a liquid length of the liquid sample held in the flow channel and calculate a volume of the liquid sample.

6. The analysis device as recited in claim 5,
wherein the liquid collection device is configured to correct a suction amount of the liquid sample based on the calculated volume of the liquid sample.

7. The analysis device as recited in claim 5,
wherein the liquid collection device is configured to correct a result of a measurement of the liquid sample based on the calculated volume of the liquid sample.

8. The analysis device as recited in claim 1,
wherein the device main body includes a guide located at the first opening configured to guide insertion of the flow channel member into the first opening, and
wherein the guide forms the aperture member.

9. The analysis device as recited in claim 1,
wherein the suction mechanism is configured to suction 1 nL to 100 nL of the liquid sample.

10. The analysis device as recited in claim 1,
wherein a hollow cross-section of the flow channel is circular.

11. The analysis device as recited in claim 1,
wherein an inner diameter of the flow channel is 2.0 mm or less.

* * * * *